United States Patent [19]

Schwarz et al.

[11] Patent Number: 5,407,236
[45] Date of Patent: Apr. 18, 1995

[54] JOINING AND ATTACHMENT PIECE FOR CORRUGATED TUBES

[75] Inventors: Ernst Schwarz, Hegnau-Volketswil; Ulrich Fastenrath, Rapperswil, both of Switzerland

[73] Assignee: PMA Elektro AG, Switzerland

[21] Appl. No.: 269,840

[22] Filed: Jul. 1, 1994

[30] Foreign Application Priority Data

Jul. 15, 1993 [EP] European Pat. Off. ............ 93111354

[51] Int. Cl.6 .............................................. F16L 47/04
[52] U.S. Cl. ....................................... 285/23; 285/319; 285/903; 285/322; 285/24
[58] Field of Search ................ 285/243, 319, 903, 322, 285/328, 921, 23, 24

[56] References Cited

U.S. PATENT DOCUMENTS

| | | | |
|---|---|---|---|
| 4,440,425 | 4/1984 | Pate et al. | 285/903 X |
| 4,625,998 | 12/1986 | Draudt et al. | 285/903 X |
| 4,836,580 | 6/1989 | Farrell | 285/319 X |
| 4,989,905 | 2/1991 | Rajecki | 285/921 X |

FOREIGN PATENT DOCUMENTS

| | | |
|---|---|---|
| 388426 | 6/1989 | Austria . |
| 86900 | 8/1983 | European Pat. Off. . |
| 465896 | 1/1992 | European Pat. Off. . |
| 3626403 | 2/1988 | Germany . |
| 3940114 | 6/1991 | Germany . |
| 2125501 | 3/1984 | United Kingdom . |

Primary Examiner—Dave W. Arola
Assistant Examiner—Heather Chun Shackelford
Attorney, Agent, or Firm—Notaro & Michalos

[57] ABSTRACT

In a housing (3) of an attachment piece (1), at least one hollow core space (5) for receiving one end of a corrugated tube (2) is available. In this hollow core space (5) between the corrugated tube (2) and the housing (3), a sleeve (4) is disposed into which the end of the corrugated tube (2) is inserted. On this sleeve (4) elastic elements (15, 16) are present which are pressed toward an axis (29) of the attachment piece (1), through an outer ring (23) on the housing (3). At least one of the elastic elements (15, 16) is equipped with one positioning element (20) and a locking element (24), with these elements (20, 24) engaging an aperture (21) in the housing (3). The connection between corrugated tube (2) and housing (3) can only be broken with an auxiliary tool and is therefore protected against unintentional detachment.

10 Claims, 1 Drawing Sheet

JOINING AND ATTACHMENT PIECE FOR CORRUGATED TUBES

FIELD AND BACKGROUND OF THE INVENTION

The invention relates to a joining and attachment piece for corrugated tubes, with at least one hollow core space encompassed by a housing with an insertion opening for receiving one end of the tube and with an opposing through-passage, as well as at least one elastic element which is provided with cams for engaging the depressions on the cylinder surface of the corrugated tube and with an outer ring for locking the elastic element in a locked position.

Corrugated tubes are widely employed, in particular as protective tubing for cables, for example control cables. Various embodiments of joining and attachment pieces are known, by means of which corrugated tubes can be connected to one another or to housings. In U.S. Pat. No. 4,440,425 a solution of this type is for example described. In this solution the joining or attachment piece comprises a tubular housing with a hollow core space into which the end of a corrugated tube is slid. On the front end of the housing, incisions are provided through which tabs are cut out of the cylinder of the housing. These elements bear cams on their inside, which engage the depressions on the cylinder surface of the corrugated tube. When sliding the corrugated tube into the housing of the joining or attachment piece, the tabs can be widened outwardly, which permits sliding in the tube. To establish the connection between the joining or attachment piece and corrugated tube, at least one male fitting ring is disposed on the housing, which ring can be moved on the housing cylinder. A locking cam and a final stop are provided on the housing tabs, which serve to position the male fitting ring in the clamping position. Before the end of the tube is slid into place, the male fitting ring or the outer ring is located in a position behind the locking cam so that the housing tabs can spring open in the outward direction through their intrinsic elasticity or can be displaced by the inserted tube. As soon as the tube end in the joining or attachment piece has been brought into the desired position, the male fitting ring is slid over the locking cam and the housing tabs are pressed against the cylinder surface of the corrugated tube. The inner diameter of the male fitting ring is dimensioned so that a firm form-fitting connection results. The male fitting ring in this connection position is located between the locking cam and the final stop, both of which are implemented so that under normal operating conditions the ring is held firmly in this position.

Because of the housing tabs cut into the housing, the strength of the Joining and attachment piece described here is considerably reduced. Under heavy loads, fractures can occur at the end portions of the tabs or at other portions of the housing. As a consequence, the security of the connection is no longer ensured. In the event the connection between tube and attachment piece is established carelessly, there is also the danger that the male fitting ring is pushed over the tabs before the tube end has been slid sufficiently far into the attachment piece. In this case there is the danger that the tube end is not held properly and that it can be torn out of the connection. Since the male fitting ring, which forms the locking element for the tabs, is disposed on the outer cylinder surface of the joining or attachment piece, the danger also exists that it is unintentionally pushed from the locked position into the starting position. In this case the connection between tube end and attachment piece would be broken, which is undesirable. If the ring and the locking cam were to be implemented so as to be so strong that the unintentional detachment is practically avoided, the locked connection could no longer be broken without destroying the joining or attachment piece. This would make handling connections of this type difficult and expensive when they are to be disassembled or modified.

From DE-A-3 626 403 a further solution is known in which the elastic elements on the housing are not disposed on the front end in the form of free tabs but rather are integrated into the housing. This allows greater strength of the housing since the housing remains closed in the form of a ring at the front end. Locking the elastic elements here also takes place with the aid of an outer ring in the form of a male fitting sleeve. This male fitting sleeve also rests on the outer cylinder surface of the housing of the joining or attachment piece and is slid on this cylinder surface in the axial direction. In this case the danger also arises that the male fitting sleeve is unintentionally displaced and that through this displacement the connection between tube end and attachment piece is broken. If this is to be avoided, the connection must be formed so that it is no longer detachable. In the case of this suggestion for a solution the tube end can be clamped tightly in the joining or attachment piece before it has been slid entirely into the hollow core space. Accordingly, the danger of forming an unsatisfactory connection exists as well as the possibility that the tube end is torn out of the attachment piece.

SUMMARY OF THE INVENTION

It is the task of the present invention to create a joining and attachment piece in which the outer ring cannot be displaced unintentionally, in which the connection between tube end and joining and attachment piece takes place only after the tube end has been slid in sufficiently far, where no additional displacements or movements of parts are necessary in the installation position of the tube end in the joining and attachment piece, but rather in which the locking of the tube takes place automatically, and in which detachment of the connection between tube and attachment piece is possible with the aid of a tool in the direction of insertion of the tube. Furthermore, the installation distance between adjacent attachment pieces is reduced to a minimum and the emplacement of seals between tube end and housing of the joining and attachment piece is made possible.

This task is solved by the features of the invention which include a housing defining at least one hollow core space with an inner cylinder surface, an insertion opening for receiving one end of the tube, and an oppose through-passage. The housing has an outer ring defining an insertion end into the core space for receiving an end of the tube, and a counterpiece for receiving a positioning element. The invention includes a sleeve which is positioned in the hollow space between the inner cylinder surface of the hollow space and the outer cylinder surface of the tube. The sleeve has a radially inwardly extending collar adjacent the through-passage and an oppose outer end in the insertion opening which is divided into a plurality of elastic cylinder elements diverging outwardly from the insertion end, when the sleeve is in an open position. The cylinder elements are separated from each other by incisions or slots and have inner surfaces that carry a plurality of inwardly radially extending cams that are engagable into the depressions of the tube when the sleeve is in a locked positioned. An outer surface of the sleeve carries a positioning element which operates with the counterpiece of the housing for retaining the sleeve to the housing when the sleeve is in its open position. The elastic elements diverge and form an open space at the outer end of the sleeve which has a diameter which is at least as large as the outer diameter of the corrugated tube. When the sleeve is moved from its open position to its locked position, the elastic elements are moved radially inwardly by their engagement against the outer ring of the housing.

The arrangement according to the invention, of a sleeve between the corrugated tube and the housing of the joining and attachment piece, permits the optimal adaptation of the structural elements to the required conditions. The housing can be dimensioned and implemented according to the demands made of the strength of the connection. No elements are present on the outer surface of the housing, which could be disturbed or activated through adjacent attachment pieces or machine parts.

The sleeve, which is independent of the housing and which carries the elastic elements, can also be optimally adapted to the requirements of the connection between tube end and attachment piece. Since the structural elements conventionally comprise synthetic materials, different materials can be used for the housing and the sleeve which are optimally tuned to the requirements. The elastic cylinder elements on the sleeve can be implemented from the very beginning so that in the mounting position, i.e. before the tube end is slid in, they are elastically spread so far in the outward direction that the free inner diameter of the sleeve is greater than the outside diameter of the tube end. This ensures that the tube end is slid in up to the collar on the inner end of the sleeve before the sleeve is displaced, which initiates the clamping process between sleeve and tube end. This ensures that the tube end is slid sufficiently far into the sleeve and that the desired strength of the connection is achieved after locking in the housing. Since the tube end rests on the collar of the inner end of the sleeve, with continued pushing of the tube end into the hollow core space of the housing, the sleeve is pushed further into the housing. Through this process the elastic cylinder elements are pressed against the cylinder surface of the corrugated tube through the outer ring of the housing. When the installation position has been reached, i.e. when the tube end and the sleeve are completely slid into the housing, the locking element on the outer cylinder surface of the sleeve cooperates with a counterpiece on the housing and holds the sleeve in this position. Since the cams on the inside of the elastic cylinder elements of the sleeve engage the depressions on the corrugate tube end, the corrugated tube end is locked in the housing of the joining and attachment piece, and the desired connection is ensured. The counterpiece in the housing to the locking element can be formed by a depression, an aperture or another suitable implementation which is known per se.

In the mounting or open position, i.e. before the tube and the attachment piece are pushed together, the sleeve is held in the housing through a positioning element which, in this position, also engages the counterpiece on the housing. This permits premounting the housing and the sleeve. But it is also possible to place the sleeve onto the tube end before the mounting and to establish the connection subsequently. The region of the housing between the front face and the counterpiece in the housing is implemented so that this region can be elastically spread open and the positioning element as well as also the locking element on the sleeve can be pushed through from the outside to the inside. Furthermore, in this region a recess is disposed which permits the introduction of a tool in the axial direction of the attachment piece between sleeve and housing. This offers the advantage that with the aid of a tool to be introduced axially, the locking connection between the housing or the counterpiece in the housing and the locking element can be detached. A further advantage resides in that due to the possibility of detaching the connection between tube and attachment piece in the axial direction of the tube, attachment pieces can be disposed directly adjacent and in contact one with the other, since access to the outer cylinder surface of the housing is not required. This permits, for example, implementing several ports for cables in the housing more compactly. Furthermore, the lateral accessibility to the attachment pieces no longer needs to be ensured which in practice previously had frequently been linked to difficulties. The implementation of the sleeve independent of the housing permits a simple adaptation capability to different outer forms of corrugated tubes in that only the cams of the sleeve need to be adapted to the outer form of the tube, yet the same housing can be used. A further advantage of the embodiment according to the invention also resides in that on the inner end of the sleeve in simple manner a seal bonnet can be disposed which ensures the complete tightness between housing and tube end. Depending on the requirements, the implementation of this seal bonnet can also be different without any changes on the housing. The installation is simple since the seal can be united and slid into the housing together with it.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

BRIEF DESCRIPTION OF THE DRAWINGS

In the following the invention will be explained in further detail in conjunction with an embodiment, and with reference to the enclosed drawings.

In the drawings.

DESCRIPTION OF THE PREFERRED EMBODIMENT

Figure 1:
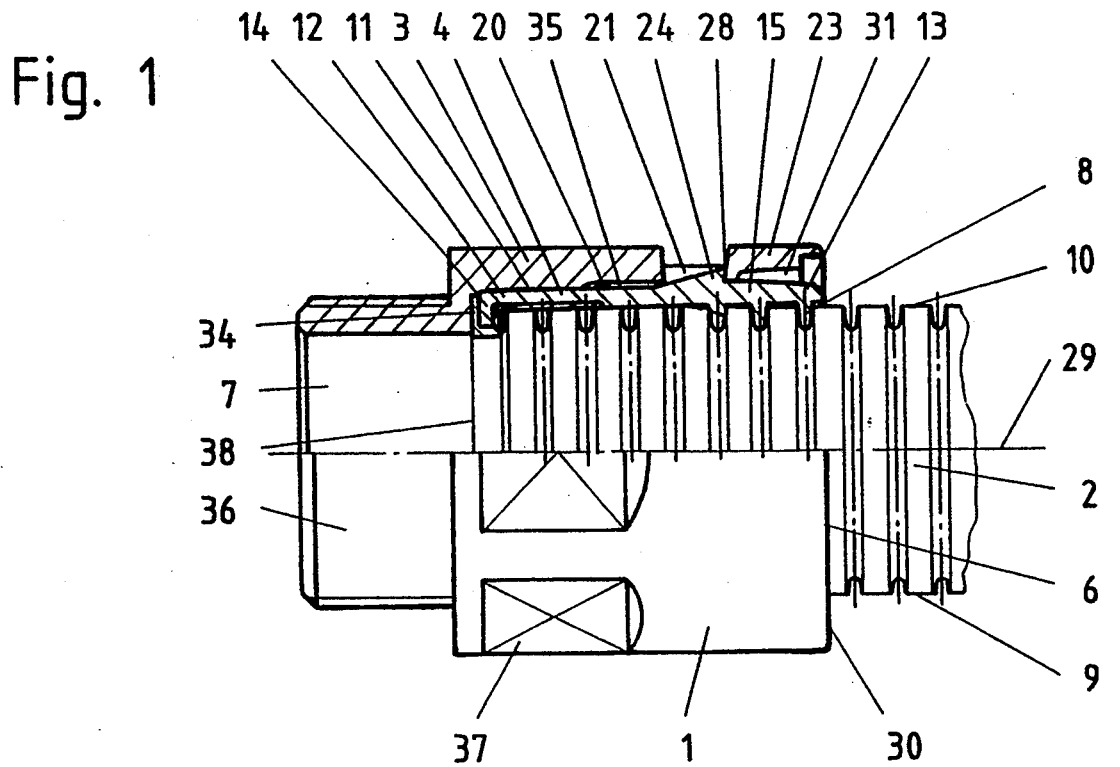
FIG. 1 is a partial sectional view through an attachment piece according to the invention with the end portion of a corrugated tube in the installation or locked position.

FIG. 1 depicts an attachment piece 1 intended for connecting a corrugated tube 2 with a machine housing (not shown). The attachment piece 1 comprises a housing 3 into which a sleeve 4 has been placed. The attachment piece 1 is equipped with a threaded stem 36 by which, in known manner, the connection to the machine housing is produced. Instead of a threaded connection, a connection known per se with elastic snap elements of a type described in U.S. Pat. No. 4,575,133 can also be arranged. The housing 3 is tubular and comprises a hollow core space 5 in the center and an adjoining through-passage 7 which extends through the threaded stem 36. This through-passage 7 serves for passing through of cables or other elements which are carried in the corrugated tube 2. On the housing 3 are contact faces 37 on which are to be placed auxiliary tools for mounting the housing 3. In the example depicted, the housing 3 and the sleeve 4 comprise a synthetic material, for example a polyamide. This permits producing these elements in a simple manner by injection molding. In the depicted installation or closed position of FIG. 1, the end of the corrugated tube 2 in the attachment piece 1 and the sleeve 4 are completely slid into the hollow core space 5 of housing 3. To this end, a collar 14 is disposed on the inner end 12 of the sleeve 4, located in the inner region of a stop face 38 at the end of the hollow core space 5 of housing 3. The end of the tube 2 is engaged against collar 14. At the outer end 13 of the sleeve 4 are disposed cams 8 which engage depressions 9 on cylinder surface 10 of the corrugated tube 2 and keep it in the installation position. The sleeve 4 comprises on the outer cylinder surface 19 a locking element 24 which engages a counterpiece in the form of a recess 21 in or on housing 3. A stop face 28 on this locking element 24 blocks the sleeve 4 in the installation position. This stop face 28 rests on a region of housing 3 which forms an outer ring 23. This outer ring 23 which is an integral part of the housing 3, maintains the elastic cylinder elements 15, 16 of sleeve 4 in the installation or closed position, and presses them in the direction of the longitudinal axis 29 of the sleeve 4, against the cylinder surface 10 of the corrugated tube 2.

At the inner end of sleeve 4 a seal bonnet 34 is placed around the collar 14, which bonnet, in the example depicted, is formed of a suitable synthetic material. This seal bonnet 34 encompasses the collar 14 of sleeve 4 and extends along the outer cylinder surface 10 of the end of the corrugated tube 2 in the direction of an insertion opening 6. This ensures a reliable and suitable seal between the stop face 38 on housing 3 and the cylinder surface 10 of the corrugated tube 2.

Figure 2:
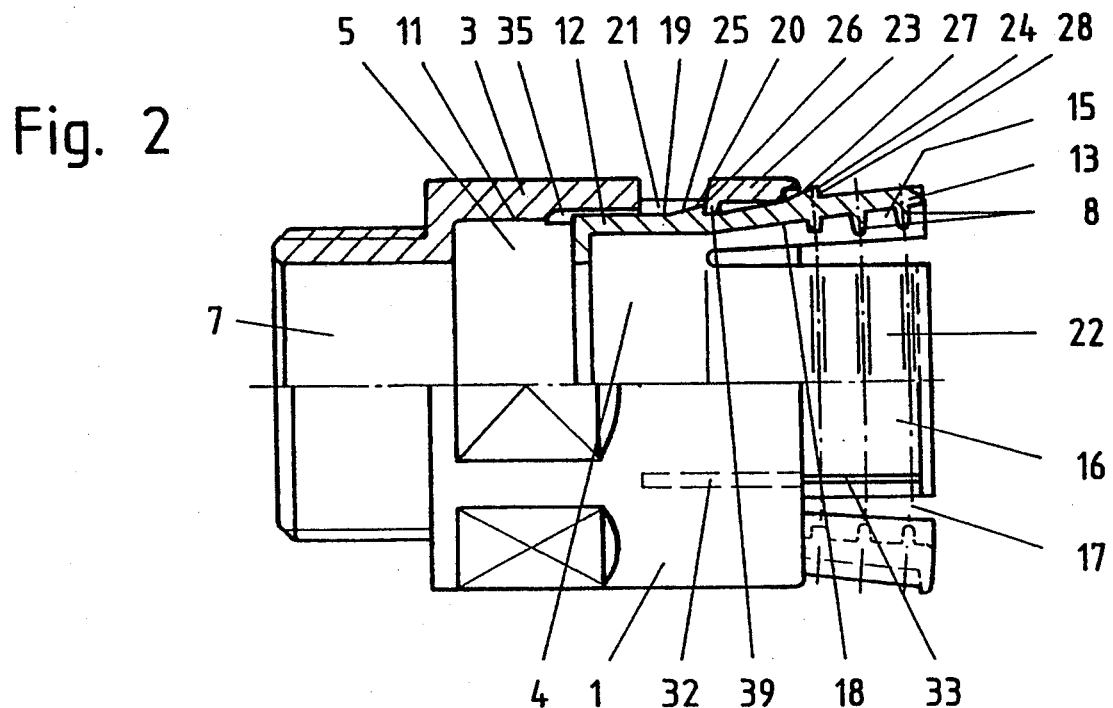
FIG. 2 is a partial sectional view through the housing and the sleeve of an attachment piece according to the invention, in the mounting or open position.

In FIG. 2 the housing 3 and the sleeve 4 are depicted in the mounting, premounting or open position and the individual elements can be seen more clearly. The corrugated tube 2 was omitted for the sake of clarity. Sleeve 4 comprises, at its outer end 13, incisions or slots 17 which extend in the direction of the longitudinal axis 29. In the example depicted, four incisions 17 of this type are disposed which divide the outer end 13 of the sleeve 4 into four cylinder elements 15, 16. In the example depicted the sleeve 4 is formed so that the cylinder elements 15, 16 diverge in the direction of the outer end 13. This widens the inner hollow space 22 encompassed by these cylinder elements 15, 16. Due to the elasticity of the material of sleeve 4 the cylinder elements 15, 16 form elastic elements which can be pressed toward the longitudinal axis 29 with the aid of the outer ring 23 on housing 3. In the mounting position shown in FIG. 2 the cylinder elements 15, 16 spring in the outward direction in such a way that the free interspace between opposing cams 8 is greater than the outer diameter of the corrugated tube 2. On the cylinder element 15 depicted in the upper region a positioning element 20 and a locking element 24 are disposed on the outer cylinder surface 19. Each of these two elements 20 and 24 comprises an oblique ramp 25 or 27 which is a portion of a cam. Adjoining each of the oblique ramps 25 or 27 is disposed a stop face 26 or 28. Compared to the outer cylinder surface 19 the positioning element 20 has a lesser superelevation than the locking element 24. The positioning element 20 and the locking element 24 are disposed in the direction of the longitudinal axis 29 at a distance one from the other which corresponds approximately to the displacement path of the sleeve 4 from the mounting position depicted in FIG. 2 into the installation position depicted in FIG. 1. In the housing 3 is disposed a recess 21 which forms the counterpiece of the positioning element 20 or the locking element 24. In the mounting position the positioning element 20 engages this recess 21 and keeps the sleeve 4 fixedly in the hollow core space 5 of the housing 3. When no corrugated tube 2 is slid into the sleeve 4, the sleeve 4 can be installed and removed in simple manner from the housing 3, since the cylinder element 15 can be elastically deflected in the direction of axis 29. On the inner surface 18 of the cylinder elements 15, 16 are disposed in at least a partial region cams 8 which serve for the form-fit connection with the depressions 9 on the corrugated tube 2. If the attachment piece 1 is to serve for receiving corrugated tubes 2 with identical outer diameters but differently formed depressions 9, the sleeves 4 can in each instance simply be replaced by sleeves which comprise corresponding cams 8. Since the outer ring 23 is implemented elastically in the region between recess 21 and the front face 30 of housing 3, the sleeve 4 can also be premounted on the end of the corrugated tube 2 and can be slid together with it into the hollow core space 5 on housing 3.

When sliding the sleeve 4 completely into the hollow core space 5 the locking element 24 must be slid through under the stop 39 on housing 3 so that it can snap into the recess 21. Since in this position the cylinder element 15 before reaching the installation position is in contact with the outer cylinder surface 10 of the corrugated tube 2, the outer ring 23 is in this region implemented so as to be elastic so that this ring region can be deflected in the outward direction and can allow the locking element to pass through. After the latter has passed through, the stop 39 snaps back and the stop face 28 In contact with cam 39 locks the sleeve 4 against return movements. As can be seen in FIG. 1 an additional recess 31 is provided in the region between the recess 21 and the front face 30 on the inner cylinder surface of housing 3. This recess 31 serves for introducing a tool, for example the tip of a screw driver, by means of which this partial region of the outer ring 23 can be deflected toward the outside and the connection between cam 39 and locking element 24 can be broken. Consequently, the corrugated tube 2 can be retracted from the installation position and the connection between attachment piece 1 and corrugated tube 2 can be detached. Detaching this connection, however, is only possible with the supplemental tool so that the connection between corrugated tube 2 and attachment piece 1 in the operating state is always ensured. Breaking the connection through an unintentional external effect is practically impossible. The auxiliary tool to be introduced in the recess 31 is activated in the direction of the longitudinal axis 29 or the insertion direction of the corrugated tube 2. The attachment piece is normally always accessible from this direction so that the subsequent detachment of the connection between corrugated tube 2 and attachment piece 1 is possible even under difficult installation conditions.

In the case of the described embodiment of an attachment piece 1 only one cylinder element 15 is provided with the positioning element 20 and the locking element 24 according to the invention. But it is also possible for two or all of the cylinder elements 15, 16 to be provided with corresponding elements 20, 24. Accordingly, in the housing 3 several recesses or counterpieces 21 would also need to be provided. In order to ensure the proper positioning of the sleeve 4 in the housing, a longitudinal rib 33 directed outwardly is disposed on one of the cylinder elements 16. On the inner cylinder surface 11 of the housing 3 a corresponding longitudinal groove 32 is worked in which extends from the front face 30 in the direction toward the stop face 38. In the premounted state of the sleeve 4 in the housing 3 the longitudinal rib 33 already engages partially the longitudinal groove 32 so that the proper pushing-together of the sleeve 4 and the housing 3 is ensured. During the complete sliding of the sleeve 4 into the installation position in the housing 3 the longitudinal rib 33 is guided in the longitudinal groove 32. Furthermore, on the inner cylinder surface 11 of housing 3 in the region between recess 21 and stop face 38 a further groove 35 is worked in which is dimensioned so that the positioning element 20 can be moved freely in this groove 35.

While a specific embodiment of the invention has been shown and described in detail to illustrate the application of the principles of the invention, it will be understood that the invention may be embodied otherwise without departing from such principles.

What is claimed is:

1. Joining and attachment piece (1) for a corrugated tube (2) having a cylinder surface (10) with depressions (9) therein, comprising:

a housing (3) defining at least one hollow core space (5) with an inner cylinder surface (11), an insertion opening (6) for receiving one end of the tube (2), and an opposite through-passage (7), the housing having an outer ring (23) defining an insertion opening into the core space for receiving an end of the tube (2), and a counterpiece (21) in the housing (3) for receiving a positioning element; and a sleeve (4) in the hollow core space (5) positioned between the inner cylinder surface (11) and the outer cylinder surface (10) of the end of tube (2) in the housing, the sleeve (4) having a radially inwardly extending collar (14) at the through-passage (7), and an outer end (13) in the insertion opening (6) which is divided into a plurality of elastic cylinder elements (15, 16) diverging outwardly from the insertion opening when the sleeve is in an open position, the cylinder elements (15, 16) being separated by incisions (17) and each having on an inner surface (18) with at least one cam (8) extending radially inwardly for engaging a depression of the corrugated tube (2) in the sleeve, for locking the elastic cylinder elements to the tube when the sleeve is in a locked position in the housing, means for locking the sleeve in said locked position in the housing, the sleeve having an outer cylinder surface (19) with at least one positioning element (20) cooperating with the counterpiece (21) in the housing for retaining the sleeve to the housing when the sleeve is in the open position, the outer end (13) of the sleeve (4) defining an open space (22) between cams (8) of the elastic cylinder elements, having a free diameter when the sleeve is in the open position, which is at least as great as an outer diameter of the corrugated tube (2), the outer ring (23) of the housing locking the elastic cylinder elements (15, 16) against the tube when the sleeve is in its locked position.

2. Joining and attachment piece as stated in claim 1, wherein the counterpiece (21) for the positioning element (20) on the sleeve (4), is an aperture in the housing (3).

3. Joining and attachment piece as stated in claim 1, wherein said means for locking includes at least one of the elastic cylinder elements (15) of the sleeve (4) carries a locking element (24) disposed on the outer surface (19), the locking element (24) being disposed at a distance from the positioning element (20), the distance corresponding to a length of displacement of the sleeve (4) from the open position to the locked position, the locking element (24) in the locked position of the sleeve (4) engaging the counterpiece (21) in the housing (3).

4. Joining and attachment piece as stated in claim 2, wherein at least one of the elastic cylinder elements (15) of the sleeve (4) carries a locking element (24) disposed on the outer surface (19), the locking element (24) being disposed at a distance from the positioning element (20), the distance corresponding to a length of displacement of the sleeve (4) from the open position to the locked position, the locking element (24) in the locked position of the sleeve (4) engaging the counterpiece (21) in the housing (3).

5. Joining and attachment piece as stated in claim 3, wherein in that the positioning element (20) and the locking element (24) on the outer cylinder surface (19) of the sleeve (4) are each formed of an outwardly directed cam with an oblique ramp (25, 27) directed toward an inner end (12) of the sleeve (4), and an adjoining stop face (26, 28) extending approximately at right angles to a longitudinal axis (29) of the sleeve (4).

6. Joining and attachment piece as stated in claim 1, wherein between a front face (30) of the housing (3) and the counterpiece (21) of the positioning element (20), a recess (31) for introducing a tool is disposed.

7. Joining and attachment piece as stated in claim 1, wherein a region of the housing (3) between the front face (30) of the housing and the counterpiece (21) of the positioning element (20), is elastic.

8. Joining and attachment piece as stated in claim 1, wherein on the inner cylinder surface (11) of the housing (3) a longitudinal groove (32) and on the outer cylinder surface (19) of the sleeve a longitudinal rib (33) engaging said longitudinal groove (32), are disposed.

9. Joining and attachment piece as stated in claim 1, including a seal bonnet (34) in the area of the collar (14).

10. Joining and attachment piece as stated in claim 1, including a groove (35) for receiving the positioning element (20) on the inner cylinder surface (11) of the housing (5) and adjoining the counterpiece (21) for the positioning element (20), in the direction toward an inner end (12) of the sleeve (4).

* * * * *